(12) United States Patent
Banninga et al.

(10) Patent No.: US 11,518,289 B2
(45) Date of Patent: Dec. 6, 2022

(54) SENSING DUMP BODY CHARACTERISTICS AND CONTROL

(71) Applicant: Deere & Company, Moline, IL (US)

(72) Inventors: Joel D. Banninga, Dubuque, IA (US); Francois Stander, Dubuque, IA (US); Michael J. Schmidt, Asbury, IA (US)

(73) Assignee: Deere & Company, Moline, IL (US)

(*) Notice: Subject to any disclaimer, the term of this patent is extended or adjusted under 35 U.S.C. 154(b) by 485 days.

(21) Appl. No.: 16/807,381

(22) Filed: Mar. 3, 2020

(65) Prior Publication Data
US 2021/0276472 A1 Sep. 9, 2021

(51) Int. Cl.
| | |
|---|---|
| *B60P 1/28* | (2006.01) |
| *E02F 9/20* | (2006.01) |
| *E02F 9/26* | (2006.01) |
| *B60P 1/26* | (2006.01) |

(52) U.S. Cl.
CPC .............. *B60P 1/283* (2013.01); *B60P 1/26* (2013.01); *E02F 9/2029* (2013.01); *E02F 9/261* (2013.01)

(58) Field of Classification Search
CPC ... B60P 1/283; B60P 1/26; B60P 1/045; E02F 9/2029; E02F 9/261
See application file for complete search history.

(56) References Cited

U.S. PATENT DOCUMENTS

| | | | | |
|---|---|---|---|---|
| 4,989,918 | A * | 2/1991 | Biddy | B60P 1/26 296/51 |
| 5,104,613 | A * | 4/1992 | Humphrey | A01C 15/003 298/7 |
| 6,217,123 | B1 * | 4/2001 | Palmberg, Jr. | B60P 1/26 298/23 M |
| 6,302,491 | B1 * | 10/2001 | Anderson | B60P 1/283 298/23 S |
| 6,499,808 | B2 * | 12/2002 | Palmberg, Jr. | B60P 1/26 298/23 M |
| 7,731,297 | B1 * | 6/2010 | Ozanich | B60P 1/26 298/7 |
| 2006/0232121 | A1 * | 10/2006 | Morley | B60P 1/26 298/23 S |
| 2010/0084908 | A1 | 4/2010 | Montocchio | |
| 2015/0166274 | A1 * | 6/2015 | Swearingen | E01C 19/48 414/809 |
| 2017/0211244 | A1 | 7/2017 | Kean et al. | |
| 2017/0219453 | A1 | 8/2017 | Landes et al. | |
| 2019/0277687 | A1 * | 9/2019 | Blank | B60W 30/18 |
| 2020/0394813 | A1 * | 12/2020 | Theverapperuma | B25J 9/163 |
| 2021/0292113 | A1 * | 9/2021 | Stander | E02F 9/265 |

FOREIGN PATENT DOCUMENTS

| | | |
|---|---|---|
| CN | 109969178 A | 7/2019 |
| DE | 102019203538 A1 | 10/2019 |

OTHER PUBLICATIONS

German Search Report issued in application No. DE102021200935.2 dated Aug. 24, 2021 (08 pages).

* cited by examiner

*Primary Examiner* — Russell Frejd
(74) *Attorney, Agent, or Firm* — Joseph R. Kelly; Kelly, Holt & Christenson PLLC

(57) ABSTRACT

A material type identifier identifies a type of material loaded into a dump truck. When the dump truck is unloaded, a flow rate identification system identifies a flow rate of material exiting the dump truck. A flow rate controller automatically controls the tailgate actuator based on a desired flow rate of material exiting the dump body of the dump truck.

20 Claims, 13 Drawing Sheets

SENSING DUMP BODY CHARACTERISTICS AND CONTROL

FIELD OF THE DESCRIPTION

The present description relates generally to dump trucks. More specifically, the present description relates to dump body control and sensing on a dump truck.

BACKGROUND

Dump trucks are currently in wide use. There are a variety of different types of dump trucks, including relatively small dumps to relatively large, articulated dump trucks. Dump trucks are often tasked with moving material from one location to another. At the ultimate location, the dump trucks often spread the material by actuating a dump actuator to raise the dump body to a dumping position, and then controlling a tailgate actuator that opens the tailgate.

These types of machines can have multiple different mechanical, electrical, hydraulic, pneumatic and electromechanical subsystems, among others. All of these may need to be operated by the operator.

The discussion above is merely provided for general background information and is not intended to be used as an aid in determining the scope of the claimed subject matter.

SUMMARY

A material type identifier identifies a type of material loaded into a dump body on a dump truck. When the dump truck is unloaded, a flow rate identification system identifies a flow rate of material exiting the dump body. A flow rate controller automatically controls the tailgate actuator based on a desired flow rate of material exiting the dump body of the dump truck.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
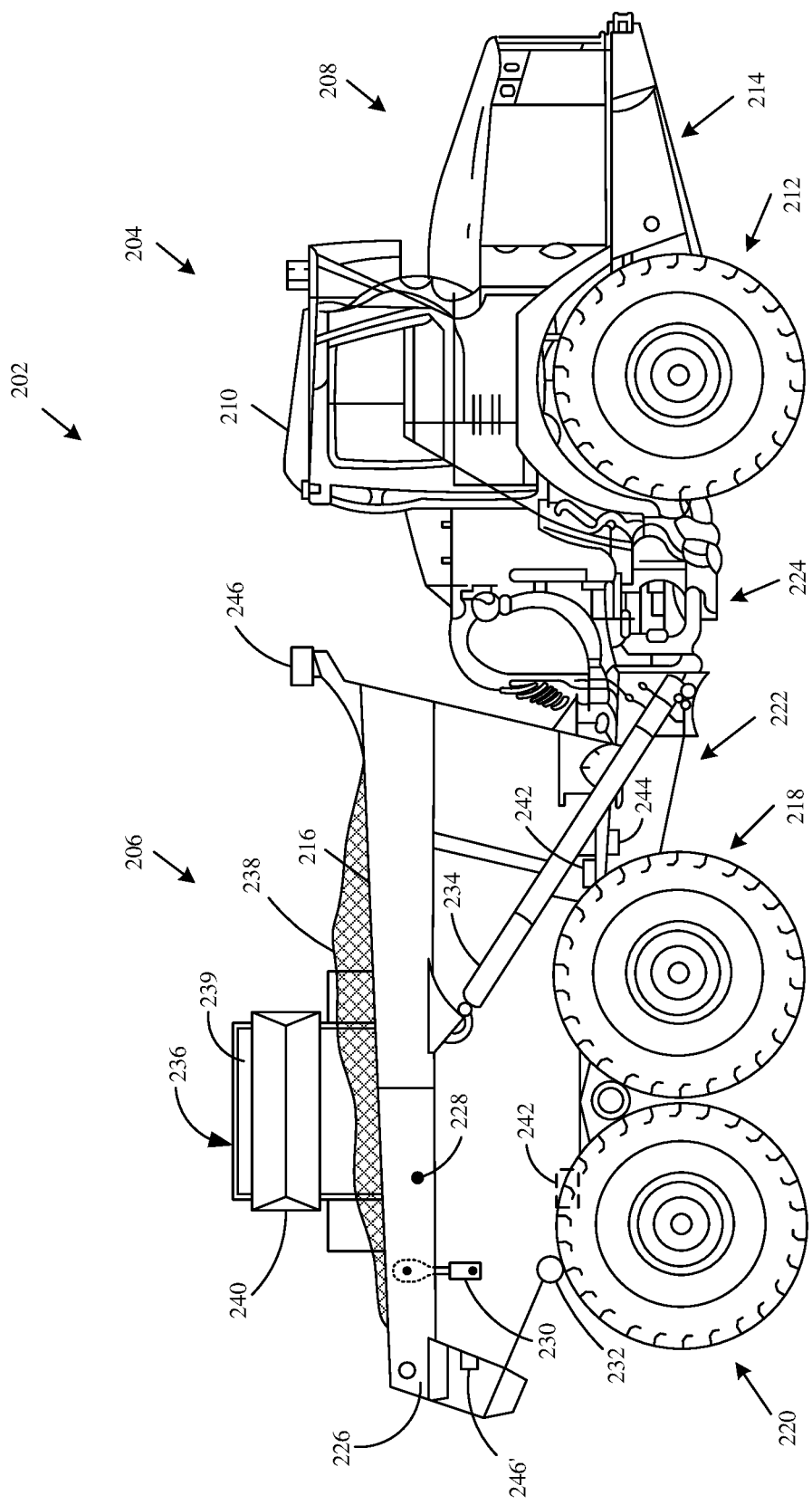
FIGS. 1A and 1B are side pictorial views of examples of a dump truck.

When a dump truck is operating on a worksite, the dump truck is often tasked with moving material from one part of the worksite to another, or adding material to the worksite, at specific locations. This is currently a highly manual process. For instance, an operator often may be informed of where to dump the material, and how to do so (to dump it in a pile or to spread it, etc.). The operator then attempts to do this by operating a manual operator input mechanism that actuates the dump actuators to move the dump body into a dumping position, and then raises the tailgate to a desired position. For instance, assume that an operator is tasked with smoothly spreading a material on the ground. The operator moves the dump actuator to raise the dump body to a dumping position while the truck is moving, and then attempts to steer the truck, control its speed, and feather a control mechanism (such as a joystick) to control the position of the tailgate in order to achieve a smooth flow of material out of the dump body.

There can be a variety of different types of operator interface mechanisms (such as pedals, steering wheel, joysticks, levers, linkages, touch sensitive display screens, etc.) that an operator needs to interact with in order to properly control the machine. Thus, it can be difficult to attain desired dumping performance using these types of mechanisms.

Similarly, it is not uncommon for dump trucks to operate over relatively rough terrain. Therefore, once a dump truck is filled, as it travels over the rough terrain, it may lose some of the material that has been loaded into the dump body. Similarly, if the dump body is overloaded, then, when the dump truck turns a corner, material may spill over the side. Thus, it can be difficult to determine the amount of material that is actually moved. For instance, even if a loading vehicle quantifies the material loaded into a dump truck, that does not mean that all of the material made it to the dumping location, as some of it may have been lost on route to the dumping location.

The present description thus proceeds with respect to a system on a dump truck that identifies the type of material being loaded into the dump truck, identifies a loaded mass or weight, and then identifies the mass or weight of the material just prior to the dumping operation. In this way, the system can accurately identify the type of material that has been moved, and the quantity that has been moved, and it can surface control signals to make adjustments, if an undesirable amount of material is lost in transport.

In addition, the present description proceeds with respect to a dump truck that has a flow rate detector that detects the flow rate (or another flow characteristic) of material exiting the dump body during the dumping operation. A desired flow rate is also obtained, and a control system automatically controls a tailgate actuator so that the tailgate position is moved to regulate the flow rate of material, based upon the desired flow rate. By automatically it is meant that the operation is performed without further operator involvement, except, perhaps to initiate or authorize the operation.

FIG. 1A illustrates one example of a mobile work machine 202, in the form of an off-road construction vehicle (illustratively a rear dump vehicle or truck). Machine 202 includes a power head section 204 and a load carrying section 206. The power head section 204 includes a vehicle engine or motor 208, an operator cab 210 and a front axle and wheels 212 which are all coupled to a front frame 214. The load carrying section 206 includes a dump body 216, a first rear axle and wheels 218 and a second rear axle and wheels 220 which are all coupled to a rear frame 222. The front frame 214 of the power head section 204 is coupled to the rear frame 222 of the load carrying section 206 by articulation and oscillation joints 224. The articulation joint enables the power head section 204 and the load carrying section 206 to pivot relative to one another about a vertical axis for steering machine 202, and the oscillation joint allows the power head section 204 and the load carrying section 206 to rotate relative to one another about a longitudinal axis extending along the length of machine 202.

FIG. 1A shows that dump body 216 has a movable tailgate 226. Tailgate 226 pivots about a pivot axis defined at 228. Movement of tailgate 226 can be driven by actuator 230. Actuator 230 can be arranged in a wide variety of different ways, and it is shown as a hydraulic cylinder for the sake of example only. Thus, actuator 230 can be controlled to raise tailgate 226 and to lower it.

FIG. 1A also shows that dump body 216 pivots about a pivot axis defined at 232. It can be pivoted between the transport position shown in FIG. 1A, and a dumping position (described in more detail below with respect to FIG. 1B). Dump body 216 is driven, for pivotal movement about axis 232, by actuator 234. Actuator 234 can be actuated to raise dump body 216 from its transport position, to its dumping position, and this is described in greater detail below with respect to FIG. 1B.

Also, in one example, there may be pairs of actuators 230 and 234. For instance, actuators 230 and 234 may have corresponding counterpart actuators similarly disposed on the opposite side of dump body 216.

FIG. 1A also shows that a loader 236 is loading material 238 into dump body 216. Loader 236 may be a front-end loader, or any of a variety of other loading machines. It can be seen in FIG. 1A that loader 236 has an operator compartment 239, where an operator operates interface mechanisms in order to control a bucket 240 to dump the material 238 into dump body 216.

FIG. 1A shows that machine 200 can have one or more weight or mass sensors 242. For example, weight or mass sensors 242 can be scales or other measurement devices disposed between the dump body 216 and the frame the supports it. Therefore, as material 238 is loaded into dump body 216, its weight or mass can be sensed by detectors 242.

Also, in FIG. 1A, the rear frame 222 can have one or more accelerometers 244 disposed thereon. Accelerometers 244 can illustratively detect accelerations imparted by the material that is loaded. By way of example, and as described in greater detail below, as the material 238 is loaded into dump body 216, the impact of the material may impart vibrations or other accelerations on accelerometers 244. The accelerations may differ based upon the particular type of material 238 being loaded. For instance, if boulders are being loaded by loader 236 into dump body 216, the accelerations sensed by accelerometers 244 will be different than if the loaded material is sand, aggregate, etc.

FIG. 1A also shows that dump truck 202 has one or more flow rate sensors 246 disposed thereon. The flow rate sensor 246 can be a camera with image processing logic or other mechanism that provides a signal indicative of the rate at which the material 238 is flowing into and/or out of dump body 216. For instance, when the dump body 216 is raised to its dumping position, then sensor 246 can illustratively generate an output indicative of how quickly the material is flowing out of dump body 216. Thus, sensor 246 can be an optical sensor, such as a mono or stereo camera, or a wide variety of other sensors.

FIG. 1A also shows that sensor 246 can be disposed at a different location indicated by 246'. Thus, when the material 238 is being dumped, tailgate 226 may be lifted by actuator 230 so that the sensor 246' has a view of the material as it is exiting through the rear of dump body 216. This is also described in greater detail below.

Figure 1B:
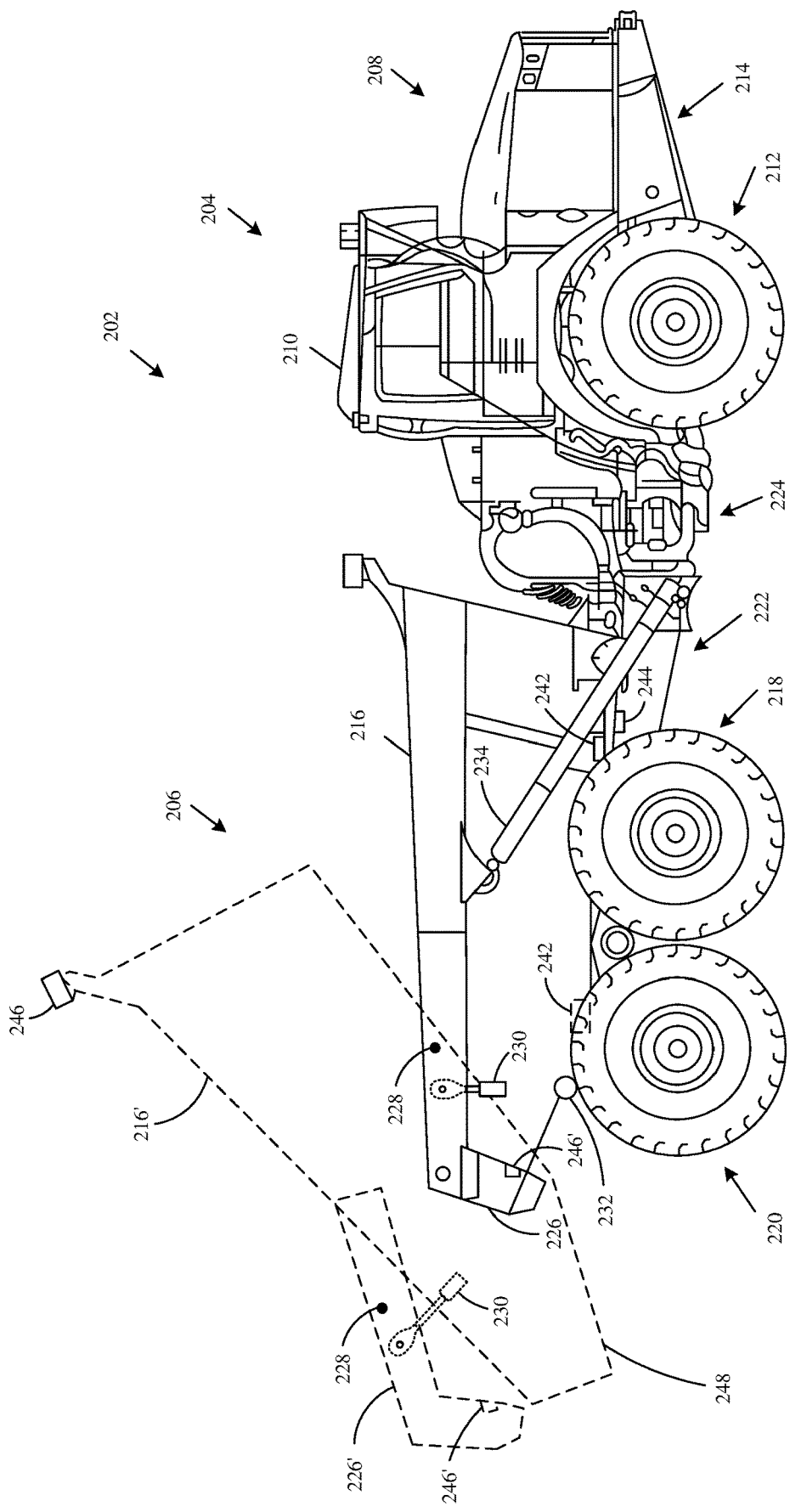

FIG. 1B is similar to FIG. 1A, and similar items are similarly numbered. However, FIG. 1B now shows, in dashed lines, the position of that dump body 216 when it is moved into a dumping position so that the material can flow out the dumping end 248 of dump body 216. FIG. 1B also shows that tailgate 226 has been raised to a dumping position and is thus indicated by 226'. In one example, actuator 230 is variably controllable so that it can move tailgate 226 upwardly by relatively small increments. This can be done in order to control the flow rate of the material 238 out of dump body 216, as it is being dumped. Again, this is described in greater detail below.

As discussed above, it can be difficult for an operator to identify whether, or how much, of the material 238, that was loaded into dump body 216, was lost prior to it being dumped. Similarly, it can be difficult for an operator to keep track of the number of different loads of different types of material that the operator is transporting. Further, it can be difficult for the operator to control the rate at which the material 238 flows out of dump body 216 when it is dumped. The present discussion thus proceeds with respect to mechanisms which address these difficulties.

Figure 2:
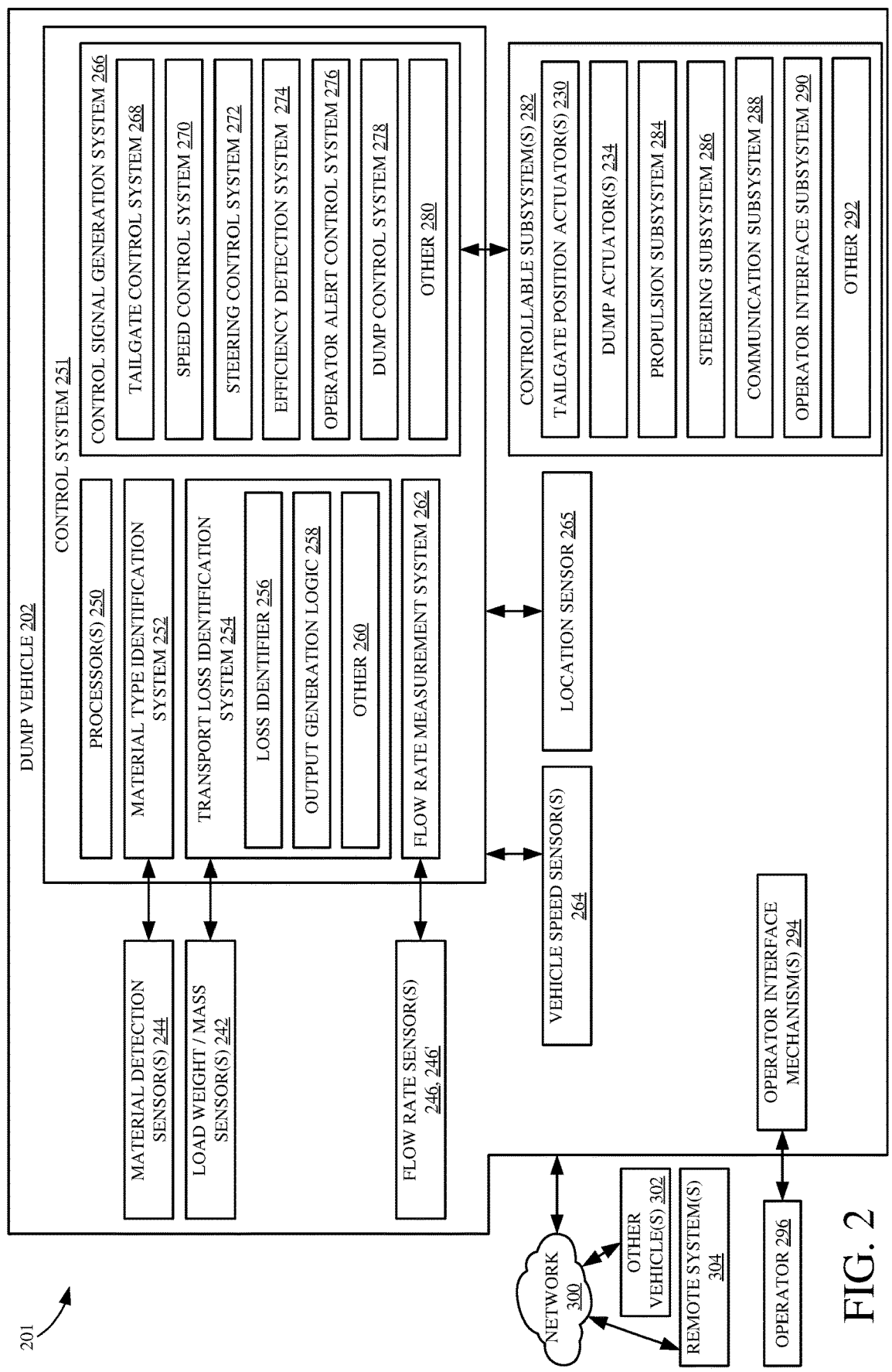
FIG. 2 is a block diagram of one example of a dump vehicle architecture.

FIG. 2 is a block diagram showing one example of dump vehicle 202 in a dump vehicle architecture 201. Some items shown in FIG. 2 are similar to those shown in FIGS. 1A and 1B, and they are similarly numbered. FIG. 2 shows that dump vehicle 202 can include a control system 251 that includes one or more processors 250, a material type identification system 252 that receives an input from material detection sensors (which may be accelerometers 244) and identifies the type of material, based upon the material detection sensor signals. Control system 251 also illustratively includes transport loss identification system 254 which, itself, can include loss identifier 256, output generation logic 258, and other items 260. Transport loss identification system 254 is shown receiving an input from load weight/mass sensors 242. As is described in greater detail below, in one example, loss identifier 256 can receive the signal from sensors 242 to identify a weight or mass of the material 238 in dump body 216 after it is loaded, and then again just before it is dumped. This will indicate the amount of material that is lost in transport. Output generation logic 258 can generate an output indicative of the identified loss.

Control system 251 also includes flow rate measurement system 262 that receives a signal from flow rate sensors 246, 246'. As discussed above, sensors 246, 246' may be optical sensors and flow rate measurement system 262 can be logic that calculates the change in volume of the material over time, as it is being dumped, based upon the optical sensor signals received. Where sensors 246, 246' are different types of sensors, then flow rate measurement system 262 can measure the flow rate in other ways as well.

Vehicle 202 also illustratively includes one or more vehicle speed sensors 264. Sensors 264 can be included in a position sensor, such as a GPS receiver or other location sensors. The location sensor is shown at block 265. The change in vehicle position over time can be used to derive its speed. Speed sensors 264 can also be other types of sensors that provide a signal indicative of ground speed of vehicle 202. For instance, they can sense the speed of rotation of one or more axles, they can include RADAR or LIDAR systems that can be used to sense the speed at which the vehicle is moving, or they can be other sensors as well.

Control system 251 also includes a control signal generation system 266. System 266 can include tailgate control system 268, speed control system 270, steering control system 272, efficiency detection system 274, operator alert control system 276, dump control system 278 and it can include a wide variety of other systems 280. Control signal generation system 266 generates control signals to control one or more of a plurality of different controllable subsystems 282. The controllable subsystems 282 can include tailgate position actuators 230, dump actuators 234, propulsion subsystem 284, steering subsystem 286, communication subsystem 288, operator interface subsystem 290, and it can include other subsystems 292.

Tailgate control system 268 can receive inputs from the various systems 252, 254 and 262, among other things, and generate control signals to control tailgate position actuators 230. For instance, tailgate control system 268 can receive an input indicative of a desired flow rate of material out of dump body 216, when it is being dumped, and control the tailgate position actuators 230 to move the tailgate to a position to accommodate that flow rate. Speed control system 270 may receive an input indicative of the desired speed of vehicle 202, given the current flow rate. For instance, it may be that a desired amount of material is to be dumped, per unit of distance traveled by vehicle 202. In that case, speed control system 270 can control propulsion system 284, based on the signals from vehicle speed sensors 264 and the measured flow rate, in order to control the speed of the vehicle 202 to obtain the desired amount of material dumped per unit of distance traveled.

Steering control system 272 can control the steering subsystem 286 to control steering of vehicle 202. This can be done in a wide variety of different ways. Efficiency detection system 274 can use the measured mass or weight of the material 238 when it is loaded into dump body 216, and the mass or weight of that material just prior to being dumped to determine the efficiency of the transport operation. It can also use the input from material type identification system 252 (which identifies the type of material that was loaded) to determine how much of that material is being moved by this particular vehicle, by the operator that is currently logged in to operate the vehicle, per shift, etc.

Operator alert control system 276 can generate control signals for operator interface subsystem 290 to alert the operator or provide outputs to the operator of various information. For instance, when the flow rate of the material exiting dump body 216 is too high or too low, and alert can be generated so that the operator can take corrective action. This is just one example. Dump control system 278 can generate control signals for the dump actuators 234. This can be done to move dump body 216 between its transport position and its dump position.

Communication subsystem 288 can be controlled by a variety of different control signal generation systems 266 or controllable subsystems 282 to communicate various information. In one example, vehicle 202 includes operator interface mechanisms 294 that an operator 296 interacts with in order to control and manipulate dump vehicle 202. The operator interface mechanisms can include such things as joysticks, pedals, levers, steering wheel, speakers, visual display screens or a wide variety of other audio, visual, mechanical or haptic interface mechanisms. Thus, communication subsystem 288 can control a display or other item of operator interface mechanisms 294 to display an alert to operator 296. It can also send communications over a network 300 to other vehicles 302 or any of a variety of different types of remote systems 304. Other vehicles 302 can be alerted, for instance, to the condition of a path over which vehicles 302 are about to travel. For example, if transport loss identification system 254 identifies a relatively high material loss during transport, then efficiency detection system 274 can control communication subsystem 288 to send a communication to other dump trucks to slow down because the path is rough. System 274 can also send a message to loader 236 to not fill vehicle 202 as high because it is resulting in loss. These are examples only.

Other remote systems 304 can be manager systems, vendor systems, or other systems that can receive data from dump vehicle 202. The data can include efficiency data, control data, speed data, material type data, flow measurement data, or any of a wide variety of other types of data.

Figure 3:
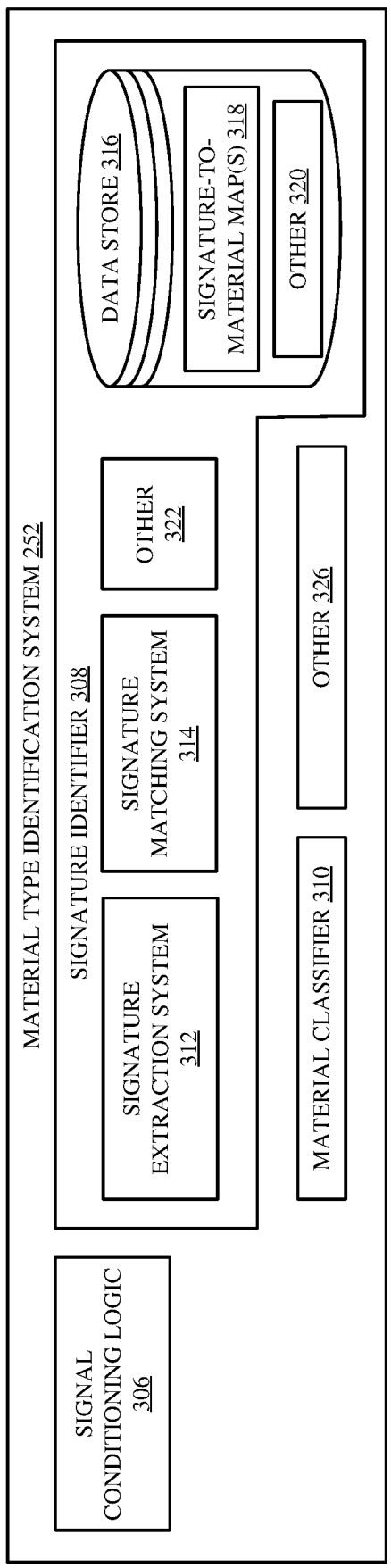
FIG. 3 is a block diagram of one example of a material type identification system.

FIG. 3 is a block diagram showing one example of material type identification system 252 in more detail. In one example, system 252 includes signal conditioning logic 306, and it can include either signature identifier 308 or material classifier 310, or both. Signature identifier 308 can include signature extraction system 312, signature matching system 314, data store 316 (which includes signature-to-material maps 318 and can include other items 320). Signature identifier 308 can include other items 322 as well.

Material type identification system 252 can also include output generator 324 and other items 326. In operation, signal conditioning logic 306 illustratively receives one or more signals from material detection sensors 244 and performs conditioning operations on those signals. It can perform linearization, normalization, filtering, amplification and/or a wide variety of other types of signal conditioning.

When signature identifier 308 is used, signature extraction system 312 extracts a signature of the sensor signal. For instance, the sensor signal may be a signal from an accelerometer. In that case, the signal will be different based upon whether the material 238 that is loaded into dump body 216 is boulders, aggregate, sand, etc. The sensed accelerations will have characteristics that map to the particular type of material being loaded. Boulders will induce relatively few, but relatively large accelerations. Sand will induce relatively small accelerations, while aggregate may induce a relatively large number of accelerations that are relatively small, but larger than those induced by sand.

Once the signature is extracted from the sensor signal, signature matching system 314 accesses the signature-to-material maps 318 in data store 316 and identifies a closest matching map. The maps 318 will illustratively map signatures to different types of material. Therefore, signature matching system 314 can compare the extracted signature against the signatures on the signature-to-material maps 318 to identify a matching signature. The corresponding material, in the signature-to-material map 318, will identify the particular type of material being loaded. When a material classifier 310 is used, the classifier 310 may be a neural network, a deep neural network or another type of classifier that receives a characteristic of the sensor signal and classifies it as a particular type of material. In one example, the signature extraction system 312 extracts a signature from the sensor signal and provides that to material classifier 310. Material classifier 310 classifies the signature to identify the type of material being loaded.

It should be noted that signature identifier 308 can be used by itself, as can material classifier 310. In another example, they are both used together to identify the particular type of material being loaded.

Output generator 324 generates an output indicative of the type of material 238 that is loaded into dump body 216.

Figure 4:
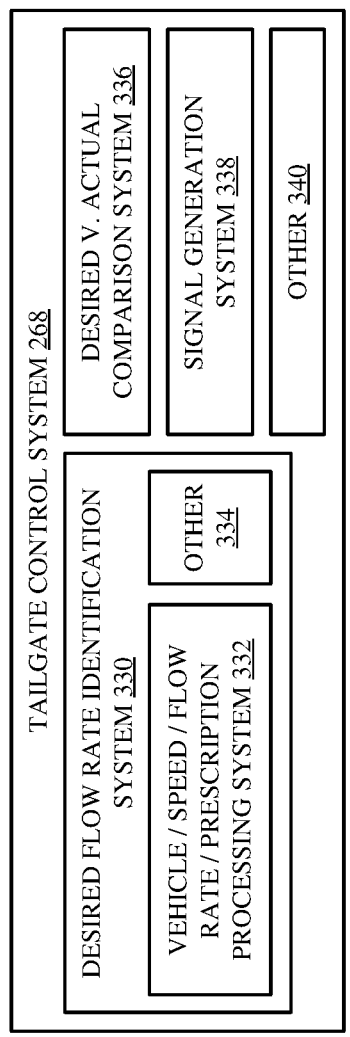
FIG. 4 is a block diagram of one example of a tailgate control system.

FIG. 4 is a block diagram showing one example of tailgate control system 268, in more detail. Tailgate control system 268 can include desired flow rate identification system 330 which, itself, can include vehicle speed/flow rate/prescription processing system 332 and other items 334. Tailgate control system 268 can also include desired versus actual comparison system 336, signal generation system 338, and a wide variety of other items 340.

Desired flow rate identification system 330 identifies the desired flow rate. For example, vehicle speed/flow rate/prescription processing system 332 can receive a current vehicle speed from vehicle speed sensors 264. It can receive a current flow rate of material out of dump body 216 from flow rate measurement system 262. It can also receive a prescription which may indicate the amount of material that is to be dumped on certain geographic locations. Thus, it can receive a location signal from location sensor 265. It can then determine the amount of material that should be dumped at the location of vehicle 202. It can determine whether the correct amount is being dumped by considering the speed of the vehicle, and the flow rate which is indicative of the amount of material exiting the vehicle over time. Thus, it can calculate the depth of material (or another metric indicative of the amount of material) that is being spread on the surface over which vehicle 202 is traveling. If too little material is being spread, then system 332 can identify a higher flow rate, which is higher than the current flow rate, as the desired flow rate. If too much material is being spread, then system 332 can identify a lower flow rate as the desired flow rate.

Desired versus actual comparison system 336 then compares the current flow rate versus the desired flow rate output by system 332. If the current flow rate is higher than the desired flow rate, an indication of this can be provided to signal generation system 338 which can generate a control signal to control the tailgate position actuators 230 to lower the tailgate so that the material flows out more slowly. If desired versus actual comparison system 336 determines that the actual flow rate is lower than the desired flow rate, an indication of this can be provided to signal generation system 338 which generates a control signal to control the tailgate position actuators 230 to raise the tailgate so that the material can be dumped more quickly.

Figure 5:
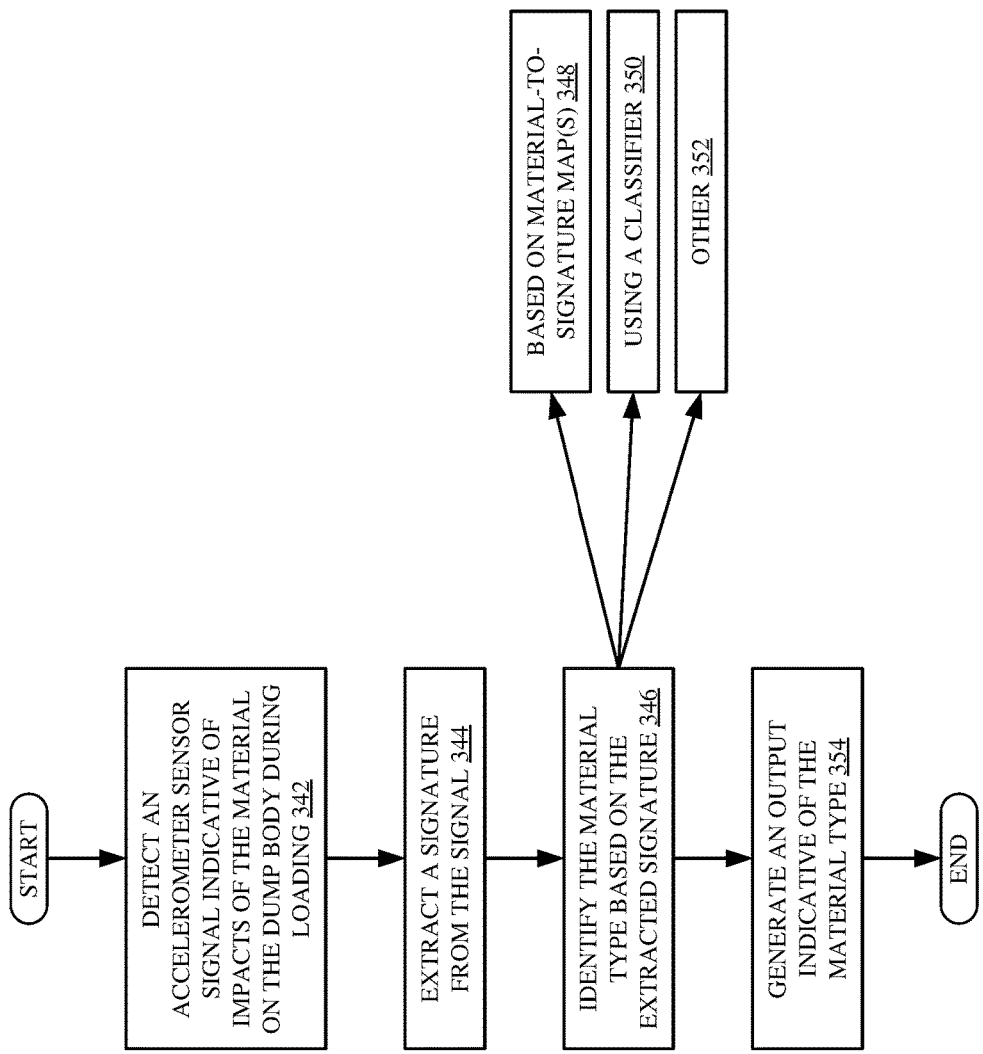
FIG. 5 is a flow diagram showing one example of identifying a material type.

FIG. 5 is a flow diagram illustrating one example of the operation of material type identification system 252 (shown in FIG. 3). It is first assumed that material detection sensors 244 are accelerometers and that they provide an accelerometer sensor signal indicative of accelerations induced by impacts of the material on the dump body 216 during loading. This is indicated by block 342 in the flow diagram of FIG. 5. Signature extraction system 312 then extracts a signature from the accelerometer signal. This is indicated by block 344. The signature can be any signature which maps to material type. For instance, it may be accelerations or signals derived from accelerations, the timing of those accelerations, the number of accelerations, etc.

Material type identification system 252 then identifies the material type based upon the extracted signature. This is indicated by block 346. In one example, signature matching system 314 identifies the material type by matching the extracted signature against a signature in the signature-to-material maps 318 in data store 316. This is indicated by block 348. In another example, material classifier 310 classifies some characteristic of the accelerometer signal (such as its signature or another characteristic) to identify the material type. This is indicated by block 350. The material type can be identified based upon the extracted signature in other ways as well, and this is indicated by block 352.

Output generator 324 then generates an output indicative of the material type. This is indicated by block 354. For instance, it may output a value indicative of the material type. It may generate a signal in other ways as well.

Figure 6A:
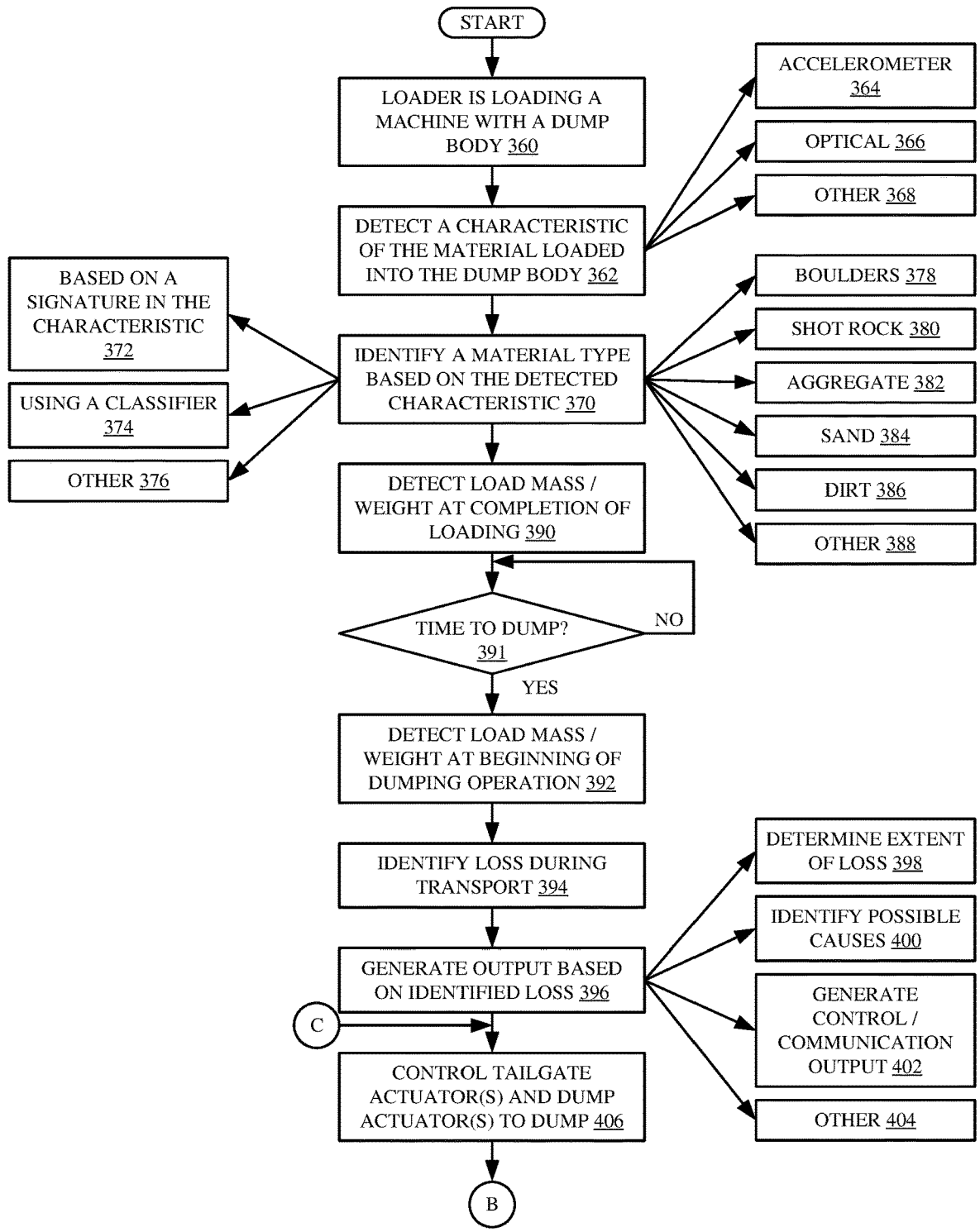
FIGS. 6A and 6B (collectively referred to herein as FIG. 6) show a flow diagram illustrating one example of loss identification and tailgate control.
Figure 6B:
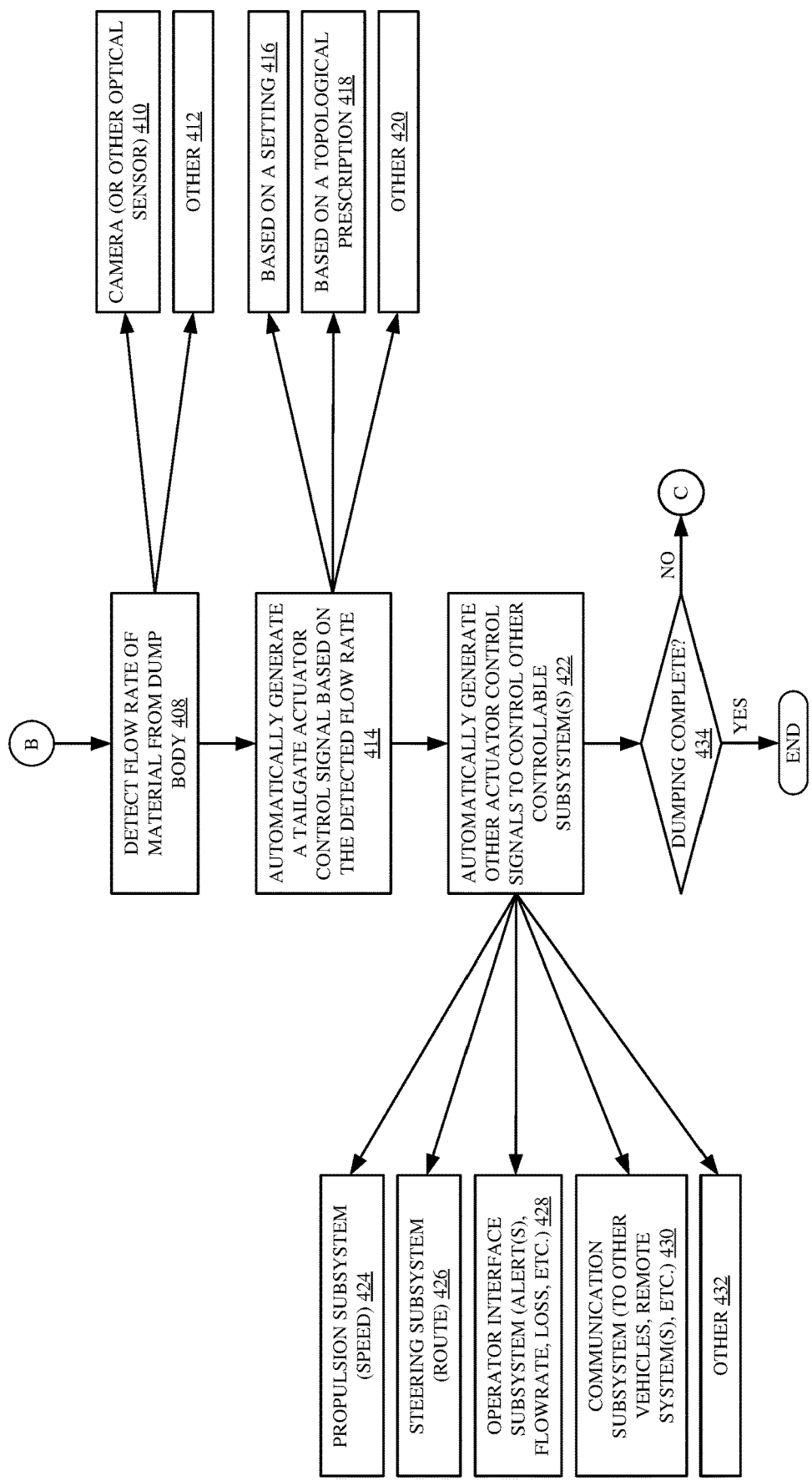

FIGS. 6A and 6B (collectively referred to herein as FIG. 6) show a flow diagram illustrating one example of the operation of control system 251 in generating control signals for controlling controllable subsystems 282. It is first assumed that loader 236 is loading material 238 into the dump body 216 of vehicle 202. This is indicated by block 360 in the flow diagram of FIG. 6. Material detection sensors 244 detect a characteristic of the material loaded into the dump body. This is indicated by block 362. For instance, the sensors can be an accelerometer 364 that generates an output indicative of accelerations imparted by the material, on the frame of vehicle 202, as it is loaded into the dump body 216. In another example, the sensor 244 can be an optical sensor 366 that generates an output indicative of optical characteristics of the material 238, such as its size, the way it moves when dumped, etc. The characteristics of the material can be sensed in other ways as well, and this is indicated by block 368.

Material type identification system 252 then identifies a material type of the material 238 being loaded into dump body 216 based upon the detected characteristic. This is indicated by block 370 in the flow diagram of FIG. 6. In one example, signature identifier 308 uses signature extraction system 312 to extract a signature from the sensor signal and signature matching system 314 matches it against maps 318 to identify the material type. This is indicated by block 372. In another example, classifier 310 can be used to classify characteristics of the signal to identify a material type. This is indicated by block 374. The material type can be identified based upon the detected characteristic in other ways as well, and this is indicated by block 376.

Examples of the different types of material that can be loaded into the dump body 216 include boulders 378, shot rock 380, aggregated 382, sand 384, dirt 386, or any of a wide variety of other material 388.

Once the material 238 is loaded into dump body 216, the load weight/mass sensors 242 detect the load weight or mass of the material. This is indicated by block 390. A signal indicative of this is provided to transport loss identification system 254.

At some point, it will be determined whether it is time to dump the material 238 from dump body 216. This is indicated by block 391. For instance, it may be that the operator provides an input indicating that actuators 234 are to move dump body 216 from the transport position to the dumping position. Other triggers can be used to determine whether vehicle 202 is about to dump material 238.

Then, just prior to dumping (e.g., based on an operator input initiating the dumping operation, based on sensed dump body movement when the dump body 216 starts moving to the dumping position or based on another trigger), load weight/mass sensors 242 again detect the weight or mass of the material 238 in dump body 216. This is indicated by block 392. Loss identifier 256 identifies any loss that occurred during transport. This is indicated by block 394.

By way of example, it may be that the road that vehicle 202 traveled over is becoming rough and needs maintenance. Traveling over the rough road may cause some of the material 238 to be lost. In another example, it may be that the operator proceeded around a corner too quickly, again causing some of the material to be lost. It may be that the material 238 was loaded too high (or too much material 238 was placed in dump body 216) by loader 236. In that case, even nominal bumps encountered along the route may cause some of the material to be lost.

Loss identifier 256 then generates an output indicative of the identified material loss. This is indicated by block 396.

The output may be indicative of the extent of loss, as indicated by block 398. It may be indicative of possible causes of the loss. For instance, the loss identifier 256 may have access to the location signal provided by location sensor 265 and the vehicle speed signal provided by vehicle speed sensors 264, as well as the outputs from the various accelerometers (e.g., material detection sensors 244) on vehicle 202. In that case, loss identifier 256 may determine the location where the weight or mass provided by sensors 242 changed abruptly. This may correspond to a corner, indicating that the operator took the corner too quickly. It may include the accelerations provided by the accelerometers as well as the vehicle speed sensors 264 to determine that the vehicle 202 was traveling over bumpy ground, or that it was traveling too quickly over uneven terrain. These and other signals can be used to identify possible causes of the material loss. This is indicated by block 400.

Output generation logic 256 then outputs a signal to control signal generation system 266 which can generate a control signal and/or a communication signal to control the various controllable subsystems 282, based upon the identified loss. This is indicated by block 402. For instance, communication subsystem 288 can generate an operator alert indicating that the loss was undesirably high. It can also communicate with loader 236 indicating that too much material was placed in dump body 216. Operator interface subsystem 290 can generate an output indicating that the operator was driving too fast, or that the operator took a corner too quickly, or other things. Communication system 288 can also communicate with a remote system 304 corresponding to an operator who operates a machine that is in charge of maintaining the surface over which vehicle 202 travels. It may indicate that the route is becoming excessively uneven so that material loss is being encountered. In that case, the communication system can be used to notify certain individuals or machines that maintenance is needed on the transport route.

The output generated by the output generation logic 258 in transport loss identification system 254 can take a wide variety of other forms as well. This is indicated by block 404.

When it is time to dump the material, dump control system 278 generates control signals to control dump actuators 234 to move dump body 216 from its transport position to a dumping position. Tailgate control system 268 also controls the tailgate position actuators 230 to move the tailgate to a dumping position. Controlling the tailgate actuators and dump actuators is indicated by block 406 in the flow diagram of FIG. 6.

Flow rate sensors 246 then detect a characteristic of the material indicative of flow rate. Flow rate measurement system 262 identifies the flow rate from the flow rate sensor signal. This is indicated by block 408 in the flow diagram of FIG. 6. Again, the flow rate sensor 246 can be a camera or other optical sensor 410, or a different type of sensor 412.

Tailgate control system 268 then automatically generates a tailgate actuator control signal based upon the detected flow rate. This is indicated by block 414. As described above, it can do this based on a desired flow rate. The desired flow rate can be input through an operator setting, as indicated by block 416. It can be based on a topological prescription which defines an amount of material that is to be spread on various locations. This is indicated by block 418. It can be based on a wide variety of other items as well, and this is indicated by block 420.

Control signal generation system 266 can also automatically generate other actuator control signals to control other controllable subsystems. This is indicated by block 422. For instance, speed control system 270 can generate a control signal to control propulsion system 284 in order to control the speed of travel of vehicle 202. This is indicated by block 424. Steering control system 272 can generate a control signal to control steering subsystem 286 to control the route or steering of vehicle 202. This is indicated by block 426. Operator alert control system 276 can generate control signals to control operator interface subsystem 290 so that various information is provided through operator interface mechanisms 294. That information can include alerts, a current flow rate, material loss, etc. This is indicated by block 428.

The control signal generation system 266, or other items, can also control communication subsystem 288 to provide communication with other items, such as other vehicles 302, remote systems 304, etc. This is indicated by block 430. Control signals can be automatically generated in a wide variety of other ways, to control other items as well. This is indicated by block 432. The processing illustratively continues until dumping is complete, as indicated by block 434. This may be detected when the dump body 216 is returned to its transport position, or when the flow rate sensor senses that there is no more material in the dump body (or that the flow rate is zero) 216, or in a wide variety of other ways.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
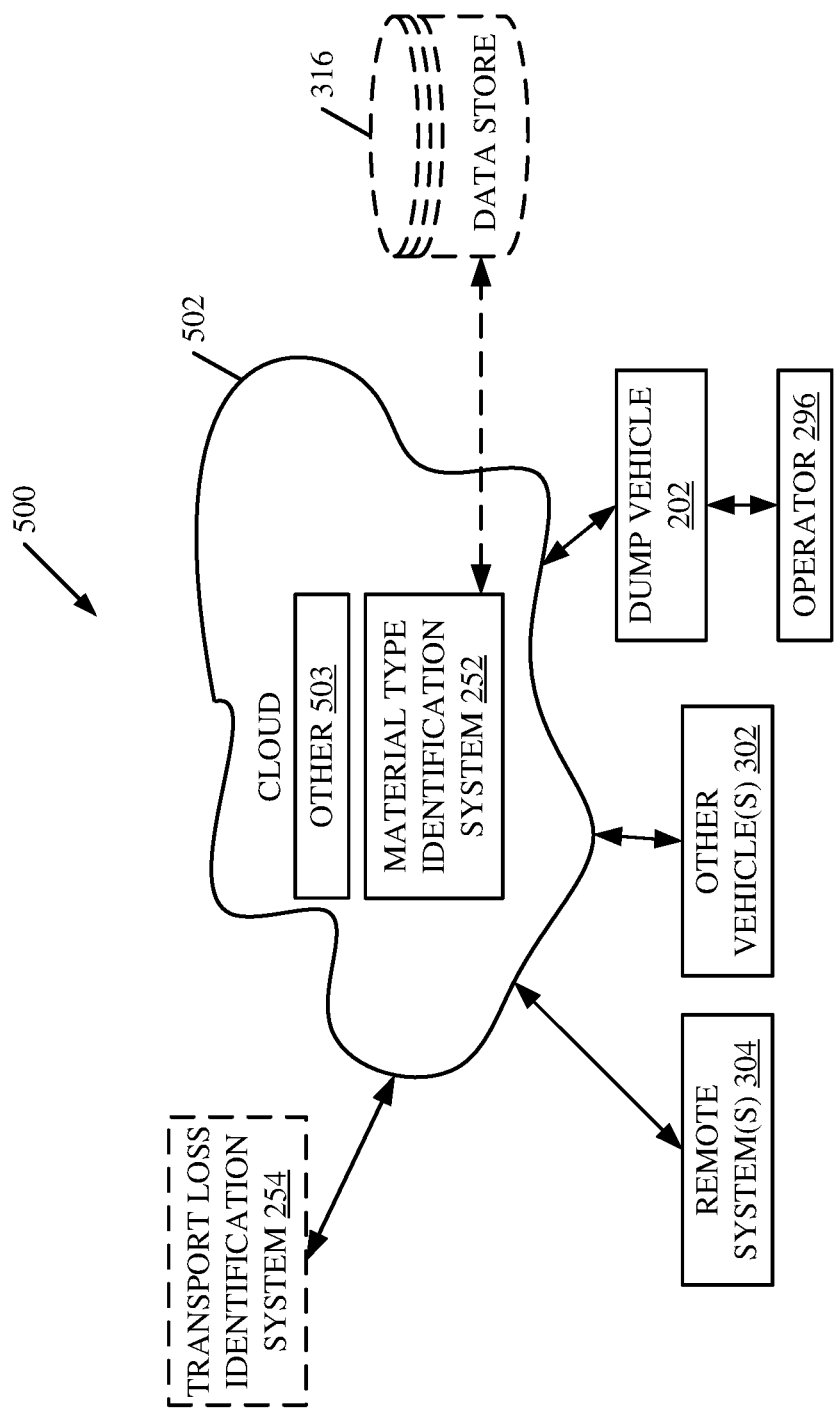
FIG. 7 is a block diagram of a remote server architecture.

FIG. 7 is a block diagram of machine architecture 201, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 2 and they are similarly numbered. FIG. 7 specifically shows that material type identification system 252 and any other items 503 can be located at a remote server location 502. Therefore, machine 202 accesses those systems through remote server location 502.

FIG. 7 also depicts another example of a remote server architecture. FIG. 7 shows that it is also contemplated that some elements of FIG. 2 are disposed at remote server location 502 while others are not. By way of example, data store 316 or transport loss identification system 254 (or other items) can be disposed at a location separate from location 502, and accessed through the remote server at location 502. Regardless of where they are located, they can be accessed directly by machine 202, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
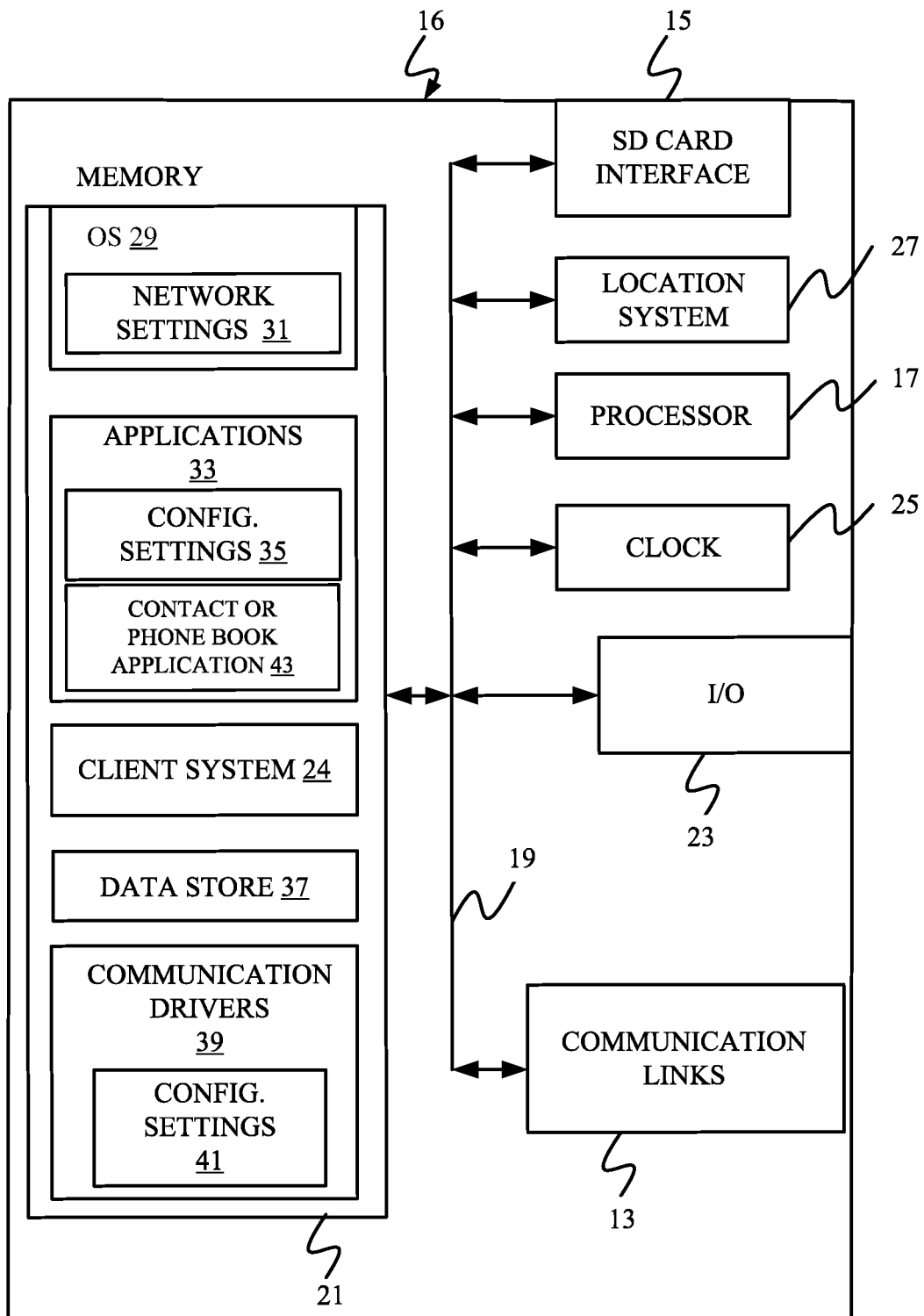
FIGS. 8, 9 and 10 show examples of mobile devices that can be used in the architecture shown in other FIGS.
Figure 9:
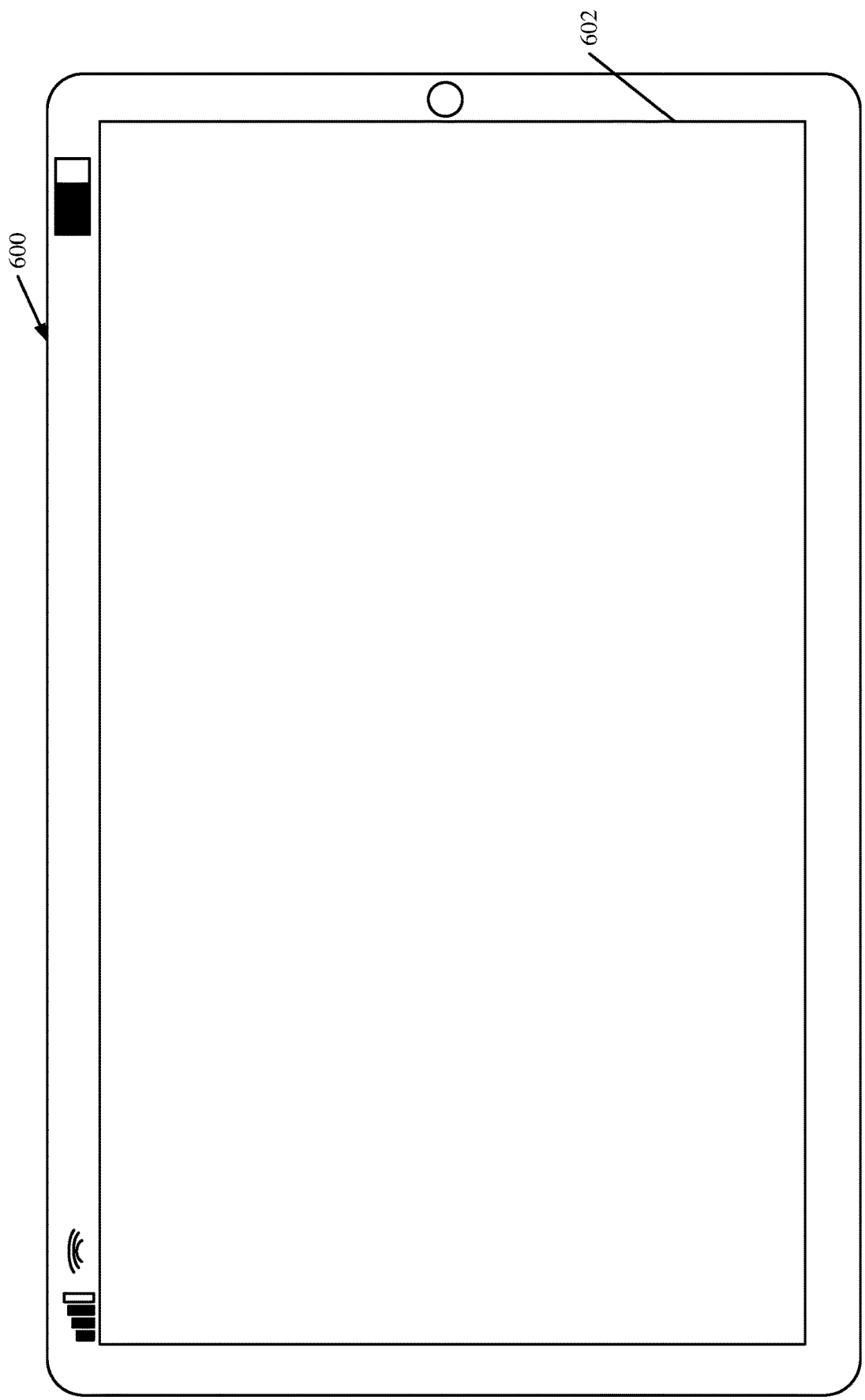
Figure 10:
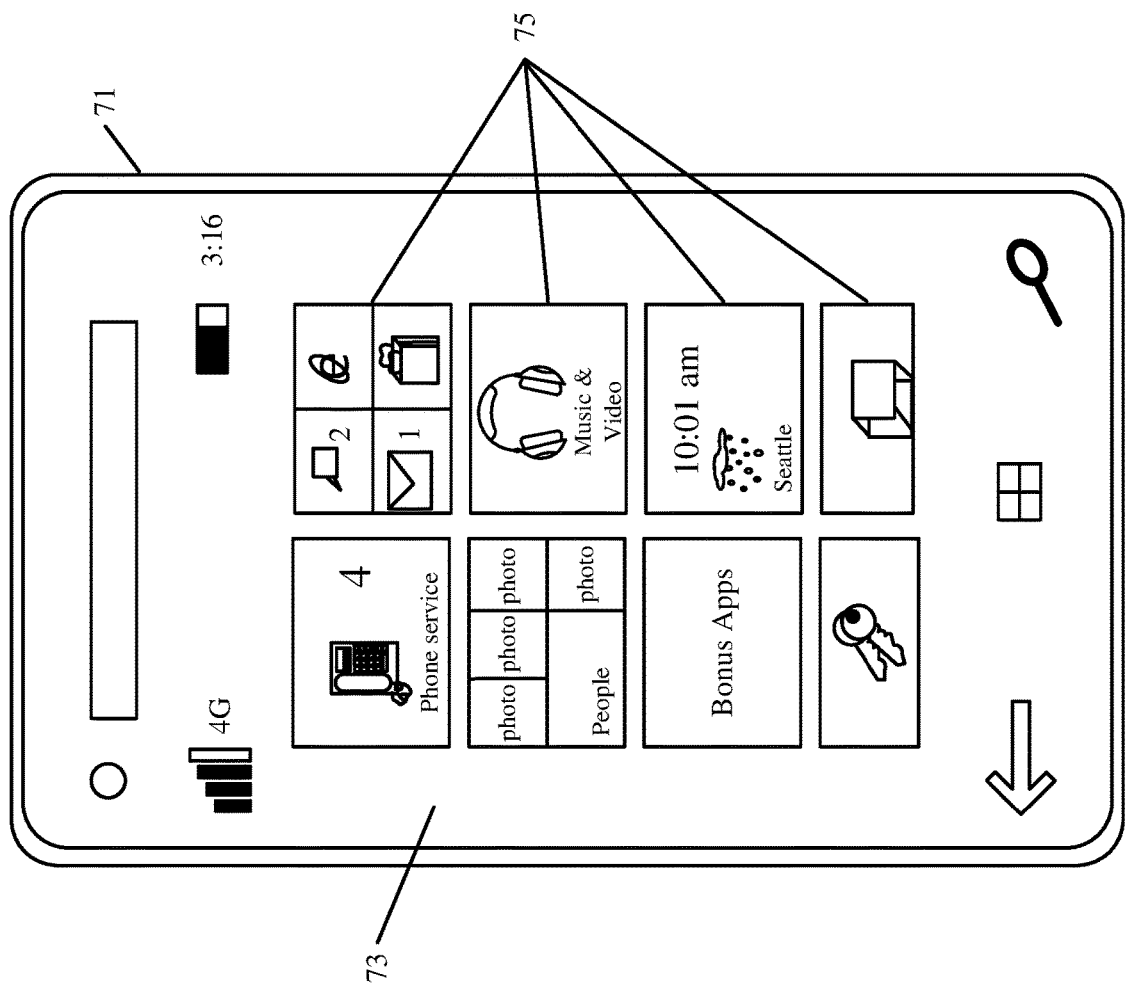

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 202 for use in generating, processing, or displaying data. FIGS. 9-10 are examples of handheld or mobile devices.

FIG. 8 provides a general block diagram of the components of a client device 16 that can run some components shown in FIG. 2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor(s) 250 from FIG. 2) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
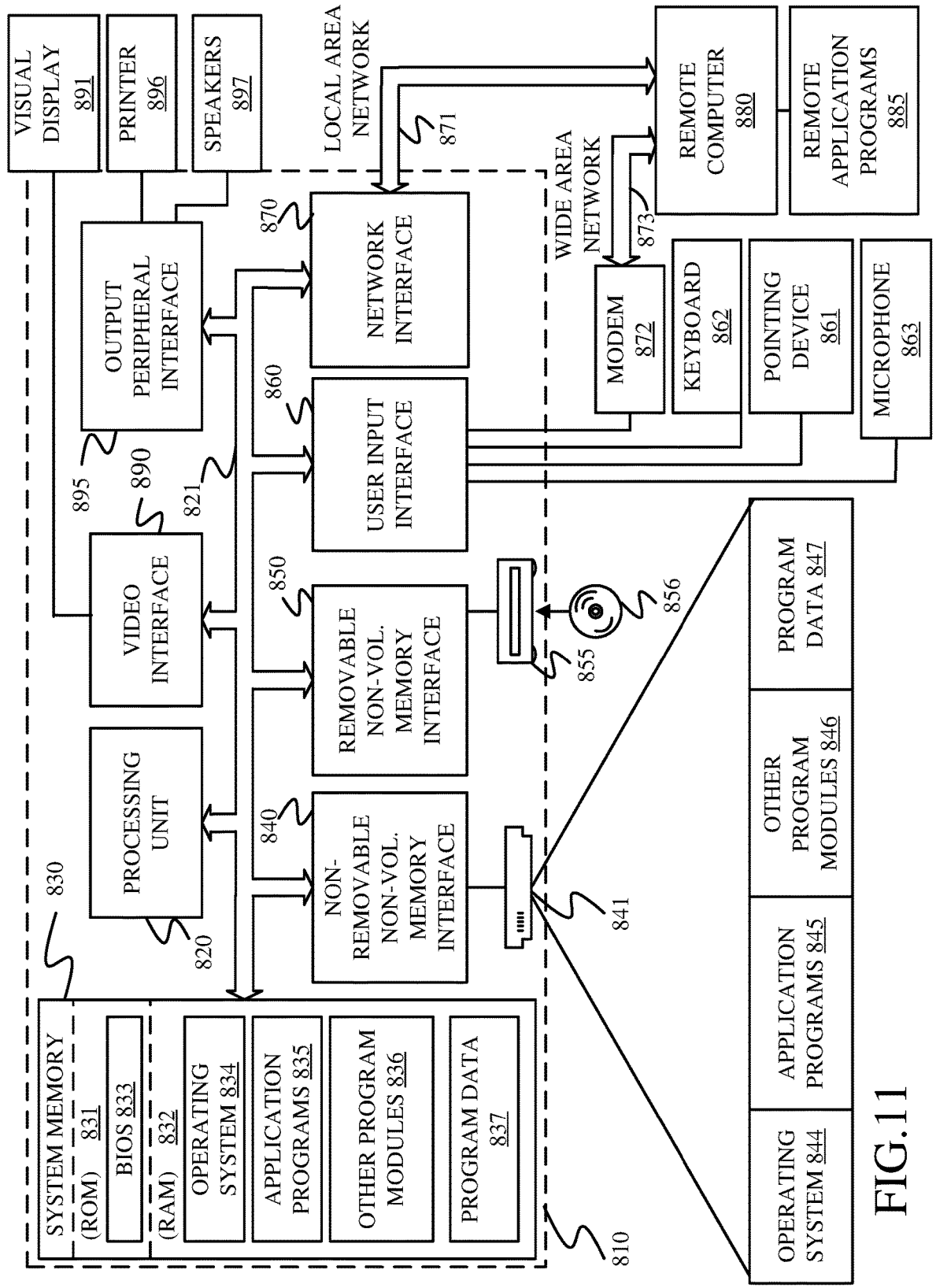
FIG. 11 is a block diagram of a computing environment that can be used in architectures shown in previous FIGS.

FIG. 11 is one example of a computing environment in which elements of FIG. 2, or parts of it, (for example) can be deployed. With reference to FIG. 11, an example system for implementing some embodiments includes a general-purpose computing device in the form of a computer 810. Components of computer 810 may include, but are not limited to, a processing unit 820 (which can comprise processor 250), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1 is a dump truck control system, comprising:
a material type identification system that receives an accelerometer signal, from an accelerometer coupled to a frame of the dump truck that supports a dump body, indicative of sensed accelerations induced by material as the material is loaded into the dump body, the material type identification system identifying a material type of the material based on the accelerometer signal;
a transport loss identification system that receives a load sensor signal and identifies a material loss value indicative of material loss; and
a control signal generation system that generates a control signal to control a controllable subsystem of the dump truck based on the identified material type and the material loss value.

Example 2 is the dump truck control system of any or all previous examples and further comprising:
a flow rate measurement system that receives a flow rate signal, indicative of a material flow rate of the material out of the dump body during a dumping operation, from a flow rate sensor and identifies the material flow rate based on the flow rate signal.

Example 3 is the dump truck control system of any or all previous examples wherein the controllable subsystem comprises a tailgate actuator that moves a tailgate of the dump truck between a closed position and an open position and wherein the signal generation system comprises:

a tailgate control system that generates a tailgate control signal to control the tailgate actuator based on the material flow rate.

Example 4 is the dump truck control system of any or all previous examples wherein the tailgate control system comprises:

a desired flow rate identification system that identifies a desired flow rate; and a signal generation system that generates the tailgate control signal based on the desired flow rate and the material flow rate.

Example 5 is the dump truck control system of any or all previous examples wherein the flow rate sensor comprises an optical sensor that generates, as the flow rate sensor signal, an optical sensor signal and wherein the flow rate measurement system comprises:

image processing logic configured to identify the material flow rate based on the optical sensor signal.

Example 6 is the dump truck control system of any or all previous examples wherein the desired flow rate identification system is configured to receive a topological prescription indicative of a desired amount of material to dump at a geographic location, a speed sensor signal from a speed sensor indicative of a ground speed of the dump truck and a geographic sensor signal from a location sensor indicative of a geographic location of the dump truck, the desired flow rate identification system being further configured to identify the desired flow rate based on the desired amount of material to dump, the ground speed of the dump truck, and the geographic location.

Example 7 is the dump truck control system of any or all previous examples wherein the material type identification system comprises:

a signature extraction system configured to extract a characteristic of the accelerometer signal.

Example 8 is the dump truck control system of any or all previous examples wherein the material type identification system comprises:

a signature matching system that matches the extracted characteristic to a signature-to-material map to identify the material type.

Example 9 is the dump truck control system of any or all previous examples wherein the material type identification system comprises:

a classifier that receives, as an input, a characteristic of the accelerometer signal and generates, as an output, an indication of the material type.

Example 10 is the dump truck control system of any or all previous examples wherein the transport loss identifier comprises:

a loss identifier that receives a first load sensor signal indicative of a mass or weight of the material after it is loaded into the dump body, before a transport operation is complete, and a second load sensor signal indicative of the mass or weight of the material prior to a dumping operation, the loss identifier identifying the material loss value based on a comparison of the first load sensor signal and the second load sensor signal.

Example 11 is a dump truck control system, comprising:

a flow rate measurement system that receives a flow rate signal, indicative of a material flow rate of material out of a dump body of the dump truck during a dumping operation, from a flow rate sensor and identifies the material flow rate based on the flow rate signal;

a tailgate actuator that moves a tailgate of the dump truck between a closed position and an open position;

a tailgate control system that automatically generates a tailgate control signal to control the tailgate actuator based on the material flow rate.

Example 12 is the dump truck control system of any or all previous examples wherein the tailgate control system comprises:

a desired flow rate identification system that identifies a desired flow rate; and a signal generation system that generates the tailgate control signal based on the desired flow rate and the material flow rate.

Example 13 is the dump truck control system of any or all previous examples wherein the flow rate sensor comprises an optical sensor that generates, as the flow rate sensor signal, an optical sensor signal and wherein the flow rate measurement system comprises:

image processing logic configured to identify the material flow rate based on the optical sensor signal.

Example 14 is the dump truck control system of any or all previous examples wherein the desired flow rate identification system is configured to receive a topological prescription indicative of a desired amount of material to dump at a geographic location, a speed sensor signal from a speed sensor indicative of a ground speed of the dump truck and a geographic sensor signal from a location sensor indicative of a geographic location of the dump truck, the desired flow rate identification system being further configured to identify the desired flow rate based on the desired amount of material to dump, the ground speed of the dump truck, and the geographic location.

Example 15 is the dump truck control system of any or all previous examples and further comprising:

a material type identification system that receives an accelerometer signal, from an accelerometer coupled to a frame of the dump truck that supports the dump body, indicative of sensed accelerations induced by the material as the material is loaded into the dump body, the material type identification system identifying a material type of the material based on the accelerometer signal.

Example 16 is the dump truck control system of any or all previous examples wherein the material type identification system comprises:

a signature extraction system configured to extract a characteristic of the accelerometer signal; and a signature matching system that matches the extracted characteristic to a signature-to-material map to identify the material type.

Example 17 is the dump truck control system of any or all previous examples wherein the material type identification system comprises:

a classifier that receives, as an input, a characteristic of the accelerometer signal and generates, as an output, an indication of the material type.

Example 18 is the dump truck control system of any or all previous examples and further comprising:

a loss identifier that receives a first load sensor signal indicative of a mass or weight of the material after it is loaded into the dump body, before a transport operation is complete, and a second load sensor signal indicative of the mass or weight of the material prior to a dumping operation, the loss identifier identifying a material loss value based on a comparison of the first load sensor signal and the second load sensor signal.

Example 19 is a method of controlling a dump truck, comprising:
receiving a flow rate signal, indicative of a material flow rate of material out of a dump body of the dump truck during a dumping operation, from a flow rate sensor;
identifying the material flow rate based on the flow rate signal; and
automatically generating a tailgate control signal to control a tailgate actuator, that moves a tailgate of the dump truck between a closed position and an open position, based on the material flow rate.

Example 20 is the method of any or all previous examples and further comprising:
receiving an accelerometer signal, from an accelerometer coupled to a frame of the dump truck that supports the dump body, indicative of sensed accelerations induced by the material as the material is loaded into the dump body; and
identifying a type of the material based on the accelerometer signal.

What is claimed is:

1. A dump truck control system, comprising:
a material type identification system that receives an accelerometer signal, from an accelerometer coupled to a frame of the dump truck that supports a dump body, indicative of sensed accelerations induced by material as the material is loaded into the dump body, the material type identification system identifying a material type of the material based on the accelerometer signal;
a transport loss identification system that receives a load sensor signal and identifies a material loss value indicative of material loss; and
a control signal generation system that generates a control signal to control a controllable subsystem of the dump truck based on the identified material type and the material loss value.

2. The dump truck control system of claim 1 and further comprising:
a flow rate measurement system that receives a flow rate signal, indicative of a material flow rate of the material out of the dump body during a dumping operation, from a flow rate sensor and identifies the material flow rate based on the flow rate signal.

3. The dump truck control system of claim 2 wherein the controllable subsystem comprises a tailgate actuator that moves a tailgate of the dump truck between a closed position and an open position and wherein the signal generation system comprises:
a tailgate control system that generates a tailgate control signal to control the tailgate actuator based on the material flow rate.

4. The dump truck control system of claim 3 wherein the tailgate control system comprises:
a desired flow rate identification system that identifies a desired flow rate; and
a signal generation system that generates the tailgate control signal based on the desired flow rate and the material flow rate.

5. The dump truck control system of claim 4 wherein the flow rate sensor comprises an optical sensor that generates, as the flow rate sensor signal, an optical sensor signal and wherein the flow rate measurement system comprises:
image processing logic configured to identify the material flow rate based on the optical sensor signal.

6. The dump truck control system of claim 5 wherein the desired flow rate identification system is configured to receive a topological prescription indicative of a desired amount of material to dump at a geographic location, a speed sensor signal from a speed sensor indicative of a ground speed of the dump truck and a geographic sensor signal from a location sensor indicative of a geographic location of the dump truck, the desired flow rate identification system being further configured to identify the desired flow rate based on the desired amount of material to dump, the ground speed of the dump truck, and the geographic location.

7. The dump truck control system of claim 1 wherein the material type identification system comprises:
a signature extraction system configured to extract a characteristic of the accelerometer signal.

8. The dump truck control system of claim 7 wherein the material type identification system comprises:
a signature matching system that matches the extracted characteristic to a signature-to-material map to identify the material type.

9. The dump truck control system of claim 1 wherein the material type identification system comprises:
a classifier that receives, as an input, a characteristic of the accelerometer signal and generates, as an output, an indication of the material type.

10. The dump truck control system of claim 1 wherein the transport loss identifier comprises:
a loss identifier that receives a first load sensor signal indicative of a mass or weight of the material after it is loaded into the dump body, before a transport operation is complete, and a second load sensor signal indicative of the mass or weight of the material prior to a dumping operation, the loss identifier identifying the material loss value based on a comparison of the first load sensor signal and the second load sensor signal.

11. A dump truck control system, comprising:
a flow rate measurement system that receives a flow rate signal, indicative of a material flow rate of material out of a dump body of the dump truck during a dumping operation, from a flow rate sensor and identifies the material flow rate based on the flow rate signal;
a tailgate actuator that moves a tailgate of the dump truck between a closed position and an open position;
a tailgate control system that automatically generates a tailgate control signal to control the tailgate actuator based on the material flow rate.

12. The dump truck control system of claim 11 wherein the tailgate control system comprises:
a desired flow rate identification system that identifies a desired flow rate; and
a signal generation system that generates the tailgate control signal based on the desired flow rate and the material flow rate.

13. The dump truck control system of claim 12 wherein the flow rate sensor comprises an optical sensor that generates, as the flow rate sensor signal, an optical sensor signal and wherein the flow rate measurement system comprises:
image processing logic configured to identify the material flow rate based on the optical sensor signal.

14. The dump truck control system of claim 13 wherein the desired flow rate identification system is configured to receive a topological prescription indicative of a desired amount of material to dump at a geographic location, a speed sensor signal from a speed sensor indicative of a ground speed of the dump truck and a geographic sensor signal from a location sensor indicative of a geographic location of the dump truck, the desired flow rate identification system being further configured to identify the desired flow rate based on the desired amount of material to dump, the ground speed of the dump truck, and the geographic location.

15. The dump truck control system of claim 11 and further comprising:
   a material type identification system that receives an accelerometer signal, from an accelerometer coupled to a frame of the dump truck that supports the dump body, indicative of sensed accelerations induced by the material as the material is loaded into the dump body, the material type identification system identifying a material type of the material based on the accelerometer signal.

16. The dump truck control system of claim 15 wherein the material type identification system comprises:
   a signature extraction system configured to extract a characteristic of the accelerometer signal; and
   a signature matching system that matches the extracted characteristic to a signature-to-material map to identify the material type.

17. The dump truck control system of claim 15 wherein the material type identification system comprises:
   a classifier that receives, as an input, a characteristic of the accelerometer signal and generates, as an output, an indication of the material type.

18. The dump truck control system of claim 11 and further comprising:
   a loss identifier that receives a first load sensor signal indicative of a mass or weight of the material after it is loaded into the dump body, before a transport operation is complete, and a second load sensor signal indicative of the mass or weight of the material prior to a dumping operation, the loss identifier identifying a material loss value based on a comparison of the first load sensor signal and the second load sensor signal.

19. A method of controlling a dump truck, comprising:
receiving a flow rate signal, indicative of a material flow rate of material out of a dump body of the dump truck during a dumping operation, from a flow rate sensor;
identifying the material flow rate based on the flow rate signal; and
automatically generating a tailgate control signal to control a tailgate actuator, that moves a tailgate of the dump truck between a closed position and an open position, based on the material flow rate.

20. The method of claim 19 and further comprising:
receiving an accelerometer signal, from an accelerometer coupled to a frame of the dump truck that supports the dump body, indicative of sensed accelerations induced by the material as the material is loaded into the dump body; and
identifying a type of the material based on the accelerometer signal.

* * * * *